(12) United States Patent
Shepard et al.

(10) Patent No.: US 9,694,850 B2
(45) Date of Patent: *Jul. 4, 2017

(54) TRAILER BACKING UP DEVICE AND TABLE BASED METHOD

(71) Applicants: Daniel Robert Shepard, North Hampton, NH (US); Britta Shepard, North Hampton, NH (US)

(72) Inventors: Daniel Robert Shepard, North Hampton, NH (US); Britta Shepard, North Hampton, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 14/852,599

(22) Filed: Sep. 13, 2015

(65) Prior Publication Data

US 2017/0073003 A1   Mar. 16, 2017

Related U.S. Application Data

(63) Continuation-in-part of application No. 13/507,671, filed on Jul. 18, 2012, now Pat. No. 9,132,856.

(60) Provisional application No. 61/572,606, filed on Jul. 18, 2011.

(51) Int. Cl.
| | |
|---|---|
| *B62D 13/06* | (2006.01) |
| *B62D 15/00* | (2006.01) |
| *B60D 1/58* | (2006.01) |
| *B62D 15/02* | (2006.01) |
| *B62D 6/00* | (2006.01) |

(52) U.S. Cl.
CPC ............ *B62D 13/06* (2013.01); *B62D 6/002* (2013.01); *B62D 15/029* (2013.01); *B62D 15/0245* (2013.01)

(58) Field of Classification Search
CPC ...... B62D 13/06; B62D 6/002; B62D 15/029; B62D 15/0245
USPC ........................................................ 701/41–43
See application file for complete search history.

(56) References Cited

U.S. PATENT DOCUMENTS

| | | | | |
|---|---|---|---|---|
| 5,247,442 A * | 9/1993 | Kendall | ................. | B62D 13/06 |
| | | | | 280/426 |
| 5,579,228 A * | 11/1996 | Kimbrough | .............. | B60D 1/06 |
| | | | | 180/14.6 |
| 6,292,094 B1 * | 9/2001 | Deng | ..................... | B62D 7/159 |
| | | | | 340/431 |
| 7,715,953 B2 * | 5/2010 | Shepard | .................... | B60D 1/58 |
| | | | | 280/400 |
| 7,950,751 B2 * | 5/2011 | Offerle | .................. | B60T 8/1708 |
| | | | | 188/112 R |

(Continued)

*Primary Examiner* — Tyler J Lee

(57) ABSTRACT

The present invention is a guidance computing system used by the driver of a vehicle towing a trailer while backing-up that rapidly calculates and predicts the direction in which the tow vehicle and trailer will become generally in-line for a given position of the steering wheel, thereby enabling the use of slower, lower cost microcomputers. This is accomplished by using a predetermined table, based on a baseline trailer of known length, having a measure of turning as one of its axes; such an axis is necessary to facilitate ratiometric scaling to convert table values to correspond to any length trailer. In a specially equipped vehicle incorporating servo-mechanisms to enable the vehicle to steer itself, the driver indicates the direction desired for the trailer to travel. The present invention also predicts left and right path limits for controlling the direction of the trailer when maneuvering complex paths.

20 Claims, 11 Drawing Sheets

(56) References Cited

U.S. PATENT DOCUMENTS

| | | | |
|---|---|---|---|
| 9,132,856 B2 * | 9/2015 | Shepard | B62D 13/06 |
| 9,352,777 B2 * | 5/2016 | Lavoie | B62D 15/027 |
| 9,374,562 B2 * | 6/2016 | Trombley | B60R 1/003 |
| 9,434,414 B2 * | 9/2016 | Lavoie | B62D 13/06 |

* cited by examiner

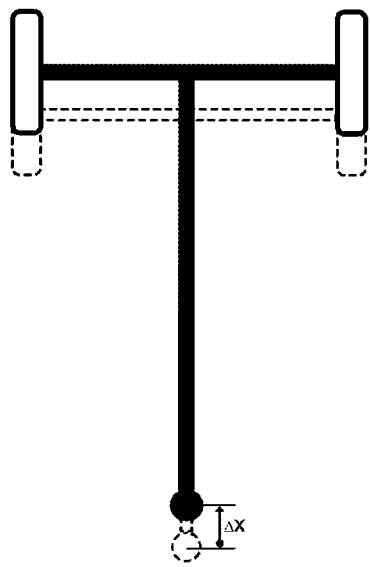
FIGURE 1
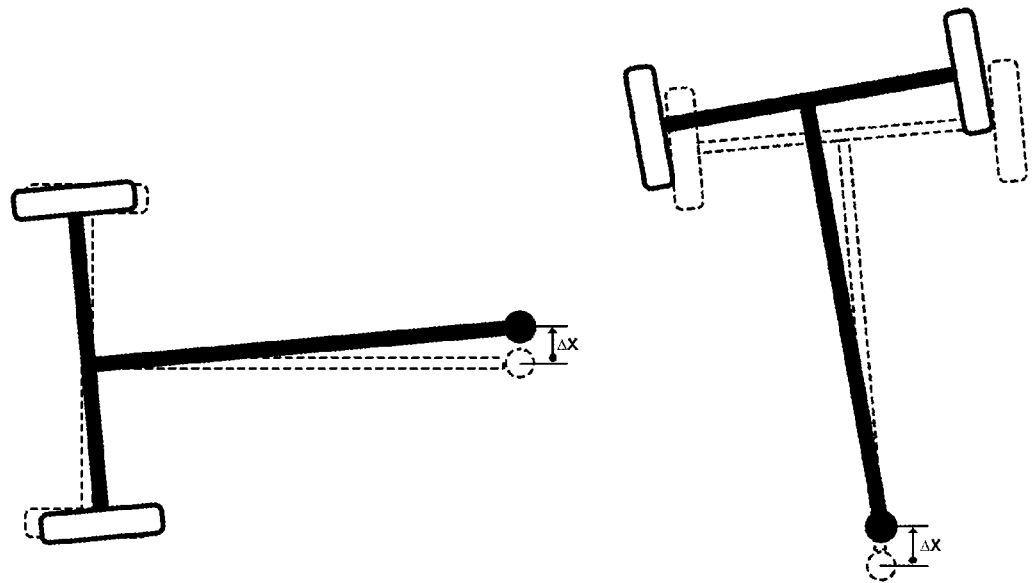
FIGURE 2A  FIGURE 2B
FIGURE 2

```
float backingEquation()
{
  int k, kMax, side;
  float alpha, beta, delta;
  float newHitchAngleRadians, lastHitchAngleRadians, turnRadius;
  // Globals referenced:
  //   hitchAngleDegrees,steeringAngleDegrees,meter_half_angle,trailerLength if (hitchAngleDegrees < -meter_half_angle)
            return -180.0;
      else if (hitchAngleDegrees > meter_half_angle)
            return 180.0;
      else if (hitchAngleDegrees == 0) {
            if (steeringAngleDegrees == 0)
                  return 0.0;
            return steeringAngleDegrees > 0 ? -180.0 : 180.0;
      }
      newHitchAngleRadians = rad(hitchAngleDegrees);
      turnRadius = angleToTurnRadius(steeringAngleDegrees);
      k = 0;
      kMax = (int)(meter_half_angle * (PI * turnRadius) / (180.0 * dX));
      kMax = kMax > 0 ? kMax : -kMax; // # steps where meter goes off scale
      side = hitchAngleDegrees > 0 ? 1 : -1;
      do {         /* do until hitch angle projection crosses zero... */
            lastHitchAngleRadians = newHitchAngleRadians;

alpha=2.0*asin(dX*sin(newHitcchAngleRadians)*0.5/trailerLength);
            beta=dX/turnRadius;
            delta=alpha-beta; //calc of delta replaceable by Taylor series if (newHitchAngleRadians > 0 && delta > 0)
                  return 180.0;
            if (newHitchAngleRadians < 0 && delta < 0)
                  return -180.0;

newHitchAngleRadians += delta;
            if (++k >= kMax) { break; }
      } while ((newHitchAngleRadians >= 0 && lastHitchAngleRadians >= 0) ||
               (newHitchAngleRadians <  0 && lastHitchAngleRadians <  0) );
      return (( k*dX) * (180.0/(PI*turnRadius))); // k*dX = distance backed
} // © 2004, Daniel R. Shepard
```

FIGURE 11

```
float angleToTurnRdius(float turnSample)
{ // value returned in same Units-of-Measure as wheel base & trailer length float hitchRadius, backWheelRadius; // , frontWheelRadius;
  int side;
  // Globals referenced:
  //   wheelbase, hitchLength, hitchLengthSquared if (turnSample == 0)
    return 10000.0;

side = turnSample > 0 ? 1 : -1;
  if (turnSample >= 90 || turnSample <=-90)
    return (float)(hitchLength * side);

// frontWheelRadius = wheelbase / sin(rad((float)(turnSample)));
  // If rear wheels turn same as front, frontWheelRadius = backWheelRadius backWheelRadius = wheelbase / tan(rad((float)(turnSample)));
  hitchRadius = sqrt(backWheelRadius*backWheelRadius + hitchLengthSquared);

return (float)(hitchRadius * side);
} // © 2004, Daniel R. Shepard
```

FIGURE 12

| HITCH ANGLE \ TURNING RADIUS | 572 | 285 | 189 | 141 | 112 | 93 | 79 | 68 | 60 | 53 | 48 | 43 | 35 | 29 | 24 | 20 | 17 | 14 | 9 | 4 |
|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 |
| 5 | ⌐ | 28° | 8° | 6° | 6° | 6° | 5° | 5° | 5° | 5° | 5° | 5° | 5° | 5° | 5° | 5° | 5° | 5° | 5° | 5° |
| 10 | ⌐ | ⌐ | ⌐ | 42° | 19° | 16° | 14° | 13° | 12° | 12° | 12° | 11° | 11° | 11° | 11° | 10° | 10° | 10° | 10° | 10° |
| 15 | ⌐ | ⌐ | ⌐ | ⌐ | ⌐ | 53° | 31° | 26° | 23° | 21° | 20° | 19° | 18° | 17° | 17° | 16° | 16° | 16° | 15° | 15° |
| 20 | ⌐ | ⌐ | ⌐ | ⌐ | ⌐ | ⌐ | ⌐ | 60° | 42° | 36° | 32° | 30° | 27° | 25° | 24° | 23° | 22° | 22° | 21° | 20° |
| 25 | ⌐ | ⌐ | ⌐ | ⌐ | ⌐ | ⌐ | ⌐ | ⌐ | ⌐ | 66° | 52° | 45° | 38° | 34° | 32° | 31° | 29° | 28° | 27° | 26° |
| 30 | ⌐ | ⌐ | ⌐ | ⌐ | ⌐ | ⌐ | ⌐ | ⌐ | ⌐ | ⌐ | 89° | 71° | 53° | 46° | 41° | 39° | 37° | 35° | 33° | 31° |
| 35 | ⌐ | ⌐ | ⌐ | ⌐ | ⌐ | ⌐ | ⌐ | ⌐ | ⌐ | ⌐ | ⌐ | 89° | 75° | 60° | 52° | 48° | 45° | 42° | 39° | 37° |
| 40 | ⌐ | ⌐ | ⌐ | ⌐ | ⌐ | ⌐ | ⌐ | ⌐ | ⌐ | ⌐ | ⌐ | ⌐ | 89° | 78° | 65° | 58° | 53° | 50° | 45° | 42° |
| 45 | ⌐ | ⌐ | ⌐ | ⌐ | ⌐ | ⌐ | ⌐ | ⌐ | ⌐ | ⌐ | ⌐ | ⌐ | ⌐ | 89° | 81° | 70° | 63° | 58° | 52° | 48° |
| 50 | ⌐ | ⌐ | ⌐ | ⌐ | ⌐ | ⌐ | ⌐ | ⌐ | ⌐ | ⌐ | ⌐ | ⌐ | ⌐ | 89° | 89° | 83° | 73° | 67° | 59° | 54° |
| 55 | ⌐ | ⌐ | ⌐ | ⌐ | ⌐ | ⌐ | ⌐ | ⌐ | ⌐ | ⌐ | ⌐ | ⌐ | ⌐ | 89° | 89° | 89° | 84° | 76° | 66° | 59° |
| 60 | ⌐ | ⌐ | ⌐ | ⌐ | ⌐ | ⌐ | ⌐ | ⌐ | ⌐ | ⌐ | ⌐ | ⌐ | ⌐ | ⌐ | 89° | 89° | 89° | 86° | 73° | 65° |
| 65 | ⌐ | ⌐ | ⌐ | ⌐ | ⌐ | ⌐ | ⌐ | ⌐ | ⌐ | ⌐ | ⌐ | ⌐ | ⌐ | ⌐ | 89° | 89° | 89° | 89° | 80° | 71° |
| 70 | ⌐ | ⌐ | ⌐ | ⌐ | ⌐ | ⌐ | ⌐ | ⌐ | ⌐ | ⌐ | ⌐ | ⌐ | ⌐ | ⌐ | ⌐ | 89° | 89° | 89° | 88° | 77° |
| 75 | ⌐ | ⌐ | ⌐ | ⌐ | ⌐ | ⌐ | ⌐ | ⌐ | ⌐ | ⌐ | ⌐ | ⌐ | ⌐ | ⌐ | 89° | 89° | 89° | 89° | 89° | 83° |
| 80 | ⌐ | ⌐ | ⌐ | ⌐ | ⌐ | ⌐ | ⌐ | ⌐ | ⌐ | ⌐ | ⌐ | ⌐ | ⌐ | ⌐ | ⌐ | 89° | 89° | 89° | 89° | 89° |
| 85 | ⌐ | ⌐ | ⌐ | ⌐ | ⌐ | ⌐ | ⌐ | ⌐ | ⌐ | ⌐ | ⌐ | ⌐ | ⌐ | ⌐ | 89° | 89° | 89° | 89° | 89° | 89° |
| 90 | ⌐ | ⌐ | ⌐ | ⌐ | ⌐ | ⌐ | ⌐ | ⌐ | ⌐ | ⌐ | ⌐ | ⌐ | ⌐ | ⌐ | ⌐ | 89° | 89° | 89° | 89° | 89° |

Column values represent CHANGE IN TOW VEHICLE DIRECTION.

FIGURE 16

TRAILER BACKING UP DEVICE AND TABLE BASED METHOD

CROSS REFERENCE TO RELATED APPLICATIONS

This application is a continuation in part of application Ser. No. 13/507,671 entitled "TRAILER BACKING UP DEVICE AND TABLE BASED METHOD", filed Jul. 18, 2012, now U.S. Pat. No. 9,132,856 issued on Sep. 15, 2015 and that application claimed the benefit of U.S. Provisional Patent application 61/572,606 and the present application claims the benefit of those applications.

REFERENCE REGARDING FEDERAL SPONSORSHIP

Not Applicable

STATEMENT REGARDING FEDERALLY SPONSORED RESEARCH OR DEVELOPMENT

Not Applicable.

FIELD OF THE INVENTION

The present invention relates to trailer systems, and more particularly to trailer systems comprising means to direct the vehicle in which way to steer so as to precisely back up and control the direction of a trailer while pushing that trailer.

SUMMARY OF THE INVENTION

Trailers have been around for many years, yet every summer and winter one can observe the owners of boats and snowmobiles, respectively, backing up those devices on trailers with great difficulty. The problem arises from the fact that a trailer being backed-up is an inherently unstable system. A trailer being pushed wants to turn around and be pulled (i.e., to jackknife) instead. To compensate for this instability, the driver must skillfully alternate the direction of his steering so as to cause the trailer to want to turn around and be pulled from opposite sides thereby repeatedly crossing the centerline of the pushing vehicle. The moment when the trailer crosses this centerline is the moment when the system goes unstable and yet is the position in which the driver would most desire to have the trailer travel.

Prior art reveals several attempts to address the problems associated with backing a trailer. The simplest solutions address parts of the problem ranging from ways of sensing the angle of the hitch (see: Kollitz, U.S. Pat. No. 4,122,390), to sensing and displaying the angle of the hitch (see: Gavit, U.S. Pat. No. 3,833,928), to sounding an alarm when a jackknife condition exists or is imminent (see: Kimmel, U.S. Pat. No. 4,040,006). While these solutions are helpful, they only each address a part of the backing problem.

To be most beneficial, the solution must address the whole problem. Furthermore, a solution must be economical, be simple in operation, and be adaptable to most two-vehicle configurations (wherein one vehicle is powered and controls the backing and the other is the trailer). Solutions such as Kendall proposed in his U.S. Pat. No. 5,247,442 is a complete solution but fails some of these tests. The Kendall solution utilizes a wound up string that is pulled out towards the desired direction of travel of the trailer, making it complex to use and potentially requiring multiple operators for safe operation. A superior solution, as will be shown herein, is to solve the basic mathematical relationships rather than comparing the differences between the angle of an unfurled string and the trailer's bumper as an approximation of the steering error for which the system must correct. Furthermore, a proper mathematical solution will naturally incorporate the proper handling of left and right turns into a single solution, rather than requiring separate machine states. A preferred approach to implement the Kendall solution, as shown herein, would be to enable the driver of the tractor (the control vehicle) to operate a pointer such that the driver would either maintain the direction of the pointer in the desired direction and then be shown where to turn the steering or, perhaps even better, to maintain the direction of the pointer in the desired direction and then have the steering follow automatically.

Kimbrough et al. in their U.S. Pat. No. 5,579,228 teach a complete solution and one should applaud their rigorous approach to the mathematics. But, the Kimbrough solution requires that the wheels of the trailer be steerable by electromechanical servos controlled by the central processing unit and therefore fails the test of adaptability as most trailers have wheels that are not steerable. The Kimbrough solution also fails the economical test as a steerable trailer as suggested would be costly and the extensive mathematical solutions could potentially require a more costly central processing unit to run the calculations in real time. The many parameters (and their sensors) to the mathematical calculations will likely increase complexity and cost.

Deng et al. in their U.S. Pat. No. 6,292,094 likewise teach a complete solution. But again fail the economical and adaptability tests with a control vehicle having both front and rear wheel steering. Many other attempts at solving this problem fail to provide an acceptable solution along the lines of the present invention.

Offerle at al. in their U.S. Pat. No. 7,950,751 as well as their U.S. Patent Application (publication number 20050206225) also fail the economical and adaptability tests with a trailer in which breaking control to the wheels on the trailer is used to effect the steering of that trailer.

Shepard in his U.S. Pat. No. 7,715,953 (the '953 patent) teaches a complete working system that solves all of the above problems. However, in that teaching, some new problems arise that are addressed by the teaching of the present invention. In particular, the mathematically intense solution of the '953 patent requires the use of a sufficiently fast microprocessor to perform the iterative calculations thereby consuming the entire capability of an inexpensive microprocessor. In practice, as such a device is incorporated into other driving control systems, this could require a dual processor solution (whereby the second processor would be dedicated to the backing algorithm), unnecessarily driving up the cost of any implementation of the invention. The '953 patent taught a variation that would compute the targeted directions of a plurality of measures of the turning radius and hitch angle in advance and stored this data in a table in the device's memory to provide a solution whereby a low cost microprocessor could be utilized and the direction of the pointer could be looked up from the values of the steering and hitch angle. But, this could result in a long start-up sequence that would unnecessarily extend the start-up time. Alternatively, the table could be preloaded for a given trailer of known length.

Finally, while the '953 patent teaches a solution to project the path of the trailer for a given pair of inputs (i.e., a turning radius and a hitch angle), it does not also project the range of all possible paths for a given hitch angle. In operation, this projection of a range of possible paths is useful when steering the trailer with a turning radius that will result in a jackknife condition (or otherwise) for those situations where the driver desires to put the trailer onto a path that is not reachable given the current hitch angle such as may be the case when one desires to reverse the sign of the hitch angle (i.e., have the trailer turn to the side opposite to that to which it is presently turning). Having an indication of this range of paths can obviate the need to reverse direction (i.e., to drive forward in order that the towing vehicle and the trailer will be better aligned). Such limits can be displayed by a meter having multiple needles, by an LCD display indicating multiple pointer directions, overlay lines on a video display, and the like. In some situations, these projected limit paths may not be displayed, but rather may be internally computed such that they may be used for projecting more complex paths.

The present invention solves the shortcomings of the '953 patent by incorporating a pre-computed table for a typical trailer. The present invention finds a solution for a standard configuration (either by table lookup or by optimized calculation) and then proportionally converts that solution into the actual current situation path solution with a simple ratiometric calculation that requires no iterations. When used in conjunction with a trailer to be backed-up, the present invention will still, like the '953 patent, indicate to the driver which direction to steer his vehicle as well as when and how much to steer and this is still accomplished with an inexpensive mechanism that can be adapted to any combination of vehicle and trailer. However, the mathematical solution to project the angle at which the vehicle and trailer become in-line is now computed in advance, in whole or in part, for any combination of vehicle and trailer and stored in the unit thereby further reducing the cost and any start-up time. Furthermore, for any given hitch angle, the upper and lower limits to where the projected paths can go are both projected by scanning the line in the lookup table for the current hitch angle and locating and displaying the projected paths for the most and least extreme projected paths. These two projected limits will correspond to the projected path of least trailer rotation while backing (i.e., the tightest turning radius that the pushing vehicle can perform) and most (infinite) trailer rotation while backing (i.e., the largest turning radius possible without jackknifing which will also be approximately the turning radius for which the trailer turns on an identical radius to the tow vehicle). These two extremes of possible steering are desirable for those situations whereby the desired direction lies outside of the range delineated by these two limits and where realignment of the tow vehicle and trailer (such as by driving forward) is undesirable. Knowing these two limits is desirable when the desired direction is indicated by the operator and the steering of the tow vehicle is automated by servo control.

The present invention can be installed in any vehicle equipped for pushing a trailer. In operation in a typical vehicle, a pointer would indicate, for the current position of the vehicle's steering wheel, the direction the trailer is projected to follow; to back-up the trailer, the driver would turn the vehicle's wheel such that the pointer is kept pointing in the direction of the intended trailer destination. With minimal modification to the towing vehicle, one would still have the option, though at a greater expense, of incorporating servomechanisms which would cause the towing vehicle to steer itself while the driver would simply indicate the direction desired for the trailer to travel (along with controlling the acceleration and breaking). Throughout this description, the terms "trailer" or (because the trailer is pushed ahead of the tow vehicle while reversing) "first vehicle" are synonymous and used interchangeably; the terms "tow vehicle" or "tractor" or (because the trailer is pushed ahead of the tow vehicle while reversing) "second vehicle" or, simply, "vehicle" are synonymous and used interchangeably; the term "projected path" or "projection of the path" refers to a path that is projected to be the path followed by the trailer and tow vehicle based on the amount of steering and the hitch angle [as opposed to what is sometimes termed a projection in the field of optics or photography whereby an image is cast by a projector].

BRIEF DESCRIPTION OF THE DRAWINGS

FIG. 1 illustrates a trailer being backed up an incremental straight distance when the trailer and backing force are in-line.

FIG. 2A-B illustrates the change in the hitch angle between a trailer and a vehicle pushing the trailer an incremental straight distance for two initial angular orientations of the trailer and vehicle.

FIG. 11 is a partial source code listing showing an iterative implementation of the backing equation.

FIG. 12 is a partial source code listing showing an approximation of a turning radius calculation.

FIG. 16 lists a table of resulting directions (in degrees) for a given initial hitch angle and turning radius according to the present invention.

DESCRIPTION OF THE PREFERRED EMBODIMENT

Figure 3:
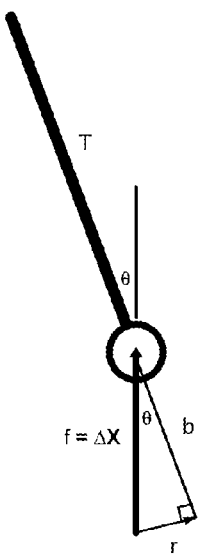
FIG. 3 illustrates the vector forces on the trailer at the hitch relating to rotating the trailer and to backing-up the trailer.

The present invention is a means to accurately back up one vehicle while controlling the backing of a trailer while keeping that trailer precisely aimed at and guided towards a targeted destination. The present invention can be applied anywhere one vehicle must control another vehicle by pushing through a single point of contact and includes car and trailer, tractor and wheeled container, or tow truck and broken-down car, to name a few. The connection between the two vehicles is accomplished with a pivotable connection or a ball-joint (called a hitch). When the two vehicles are in a straight line, the angle of the hitch, known as the hitch angle (also known as the articulation angle or the hinge), is zero degrees. This in-line position can be achieved by driving the vehicle forward far enough to cause the trailer to be pulled directly behind the vehicle.

Refer now to the figures, which show a preferred embodiment of the invention. FIG. 1 shows the ideal behavior of a trailer being pushed by a vehicle. As the vehicle backs up some distance, $\Delta x$, the trailer moves an equal distance in the same direction. FIG. 2 shows a more typical behavior of a trailer being pushed by a vehicle.

In FIG. 2A, the centerline of the trailer and the $\Delta x$ direction are perpendicular. In this case, all of the incremental motion, $\Delta x$, results in rotation of the trailer as the hitching point of the trailer is moved along the circumference (where L is the distance from the axle of the trailer to the hitching point of the trailer and where $\Delta x/2\pi L$ is the percentage of the total circumference corresponding to incremental motion, $\Delta x$, and where the amount of rotation, in degrees, is therefore equal to 360 $\Delta x/2\pi L$). This is why the shorter the trailer, the greater the rotational component for an increment of motion, and the more unstable and difficult that trailer is to back up.

In FIG. 2B, as is most often the case in normal operation, a portion of the force in the $\Delta x$ direction is translated into backing up the trailer while a portion is translated into rotating the trailer. Typically, most of the incremental motion in the $\Delta x$ direction is translated into backing up the trailer because the centerline of the trailer and the $\Delta x$ direction (along the center line of the vehicle) are usually kept close to parallel. However, following this backing up of the distance $\Delta x$, the centerline of the trailer and the $\Delta x$ direction will be less parallel due to the rotation that occurred. As a result, if the vehicle were to back up an additional distance of $\Delta x$, an even greater portion of the incremental motion would be translated into rotating the trailer. Each successive distance $\Delta x$ backed up (when backing up in a straight line) will translate into a growing portion to be applied to rotating the trailer until, and as is shown in FIG. 2A, the center line of the trailer and the $\Delta x$ direction are perpendicular. If the vehicle backs up even further, the part of that force that is in the direction of backing up the trailer becomes negative which is to say that the trailer begins to be pulled and will move towards the center line of the vehicle until the trailer is ultimately towed directly behind the vehicle—the most stable position of the vehicle and trailer in motion. Of course, in real life, if this backing were continued, the trailer would keep turning until it collides with the side of the vehicle. This action of a trailer turning around to follow the point that is pushing it is called jackknifing.

Refer now to FIG. 3 for an explanation of this pair of vector forces on the trailer when a vehicle is backing up in a straight line a distance of $\Delta x$. FIG. 3 shows that the force, f, at the hitch point of the trailer, T, is the sum of two vectors, b and r, that meet each other at a right angle. When a force, f, is applied to the hitch point of a trailer by a backing vehicle, part of that force, b, is parallel to (i.e., in-line with) the centerline of the trailer and is, therefore, in the direction of backing up the trailer. However, the other part of the force, r, is perpendicular to the centerline of the trailer and is in the direction of rotating the trailer about a point midway between its two wheels (i.e., on the centerline of the trailer). The angle between the direction of the applied force and the direction of the centerline of the trailer is called the hitch angle and, for this discussion, shall be called Theta ($\theta$). If we assume that the force, f, applied is proportional to the distance backed up, $\Delta x$, we can calculate the magnitudes of b and r as being $\Delta x \cos(\theta)$ and $\Delta x \sin(\theta)$, respectively. In practice, the hitch angle is a ball joint that enables some motion in the vertical direction, but this aspect of motion is ignored in the present invention as this motion does not significantly change the resulting operation of a system equipped with the present invention and to do otherwise would only cause an implementation of the solution to be more costly without adequate benefit to justify that cost.

For the purpose of this explanation, we will speak in terms of discreet steps of distance, $\Delta x$, instead of in terms of calculus and integrals because the solution discussed herein is performed with an approximation technique. To re-obtain an in-line position of vehicle and trailer, the vehicle must turn while backing. As a result, a series of $\Delta x$ distances backed up will actually fall along an arc, not a straight line. The radius of that arc and the total distance backed (sum of $\Delta x$'s or, more precisely, the integral) determine how quickly the vehicle and trailer will return to an in-line position.

When the operator of a vehicle attempts to back up a trailer, he wants to keep the trailer following a path that runs directly at the target—the intended line of travel. While backing up, the trailer will turn away from the intended line of travel due to the jackknifing effect. A highly skilled operator will turn the vehicle toward the side to which the trailer is jackknifing and will gradually reduce the arc of his turn as the trailer approaches the intended line of travel such that the vehicle will be moving in a straight line (the radius of the arc approaches infinity) just as the trailer once again parallel's the intended line of travel. As soon as this alignment of intended line of travel, trailer direction and vehicle direction are reached, the system becomes unstable wherein the trailer will begin to jackknife. To gain control, the operator must again turn the vehicle toward the side to which the trailer is jackknifing.

What often happens with the less skillful operator is that at the moment when the trailer is returned to the intended line of travel, the vehicle is not also in-line with the trailer. In this case, with only the trailer on the intended line of travel, the operator must now turn the vehicle back to also be in-line with the intended line of travel. But this additional backing to get the vehicle on the intended line of travel will cause the trailer to continue to turn beyond the intended line of travel. By the time the vehicle and trailer are once again in-line, the trailer is no longer heading in the intended line of travel. Often, the amount by which the trailer is off the intended line of travel to this second side is greater than the amount by which it had been off on the first side. When this occurs, the operator finds himself in a growing oscillation wherein the trailer keeps backing generally toward the intended target but with less and less control. Frequently, this oscillation can only be halted by driving the vehicle forward, directly away from the target which returns the vehicle and trailer to an in-line position that is pointed at the target, but a portion of the distance that had been covered while backing up will have been lost to the driving forward needed to rescue the operation.

The present invention provides an indication of the direction in which the trailer and vehicle will be headed when both trailer and vehicle are in-line. This indication is computed from constant information such as the length of the trailer from the axle to the hitch and variable information such as the current radius of the arc of the vehicle and the angle of the centerline of the trailer and the vehicle at the hitch (the hitch angle). There are many ways to process the necessary information.

To compute the change in the hitch angle resulting from an incremental displacement, $\Delta x$, of the hitch, two components must be considered: the increase associated with the rotation of the trailer and the decrease associated with the turning of the vehicle. The sum of these two components must be decreasing when compared over two successive increments of motion ($\Delta x$) in order to obtain convergence on a solution. When this does not occur, the vehicle operator must be alerted to change his steering or to drive forward (directly away from the target) to get the vehicle, trailer and target all in-line before continuing.

Figure 4:
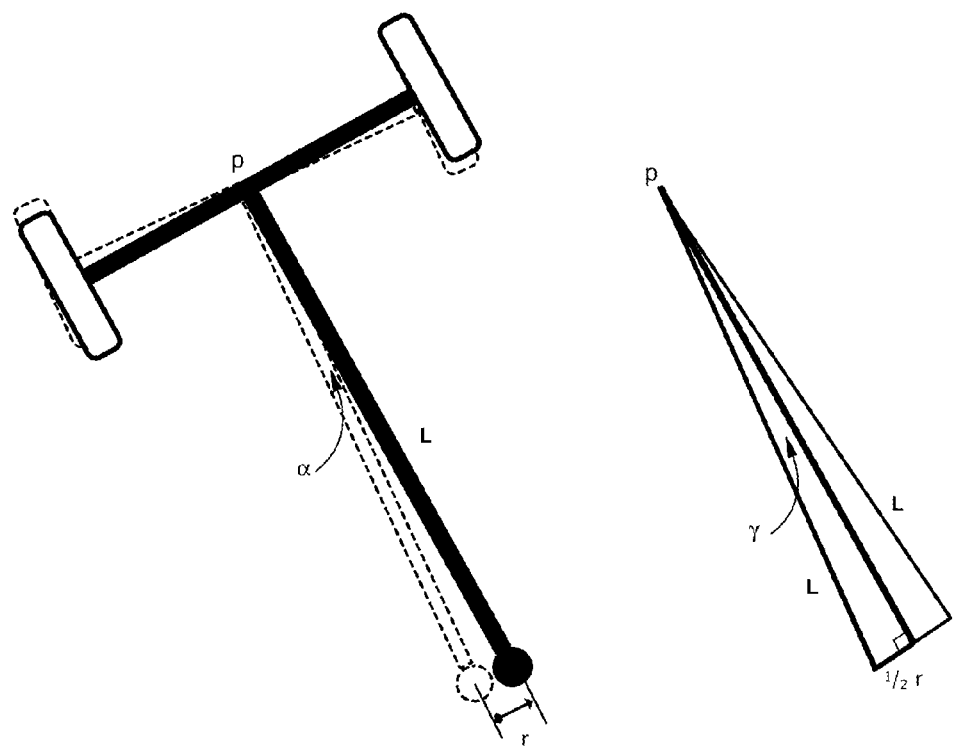
FIG. 4 illustrates the rotation resulting from the rotational component of the backing force when backing up and the associated geometries for such calculations.

Referring to FIG. 4, to calculate the angular contribution from the rotation of the trailer, $a$, to the change in hitch angle resulting from an incremental displacement, $\Delta x$, one must recognize the geometry of that rotation. The length of the trailer, L, forms two of the sides of a triangle formed when the trailer rotates about point p, where the third side is the rotation contribution component, r, as discussed above and shown in FIG. 3. From that discussion, r has the magnitude $\Delta x \sin(\theta)$. The angle of rotation, $\alpha$, is bisected in the formation of two similar right triangles each having L for their hypotenuse and $\gamma$ for half of bisected angle $\alpha$. Simple geometry dictates the relationship $\sin \gamma = \frac{1}{2} r/L$ which can be restated as $\gamma = \sin^{-1}(\frac{1}{2} r/L)$. The angular contribution from the rotation of the trailer, $\alpha$, is therefore equal to $2 \sin^{-1}(r/2L)$. Substituting in for r yields: $\alpha = 2 \sin^{-1}(\Delta x \sin(\theta)/2L)$.

Figure 5:
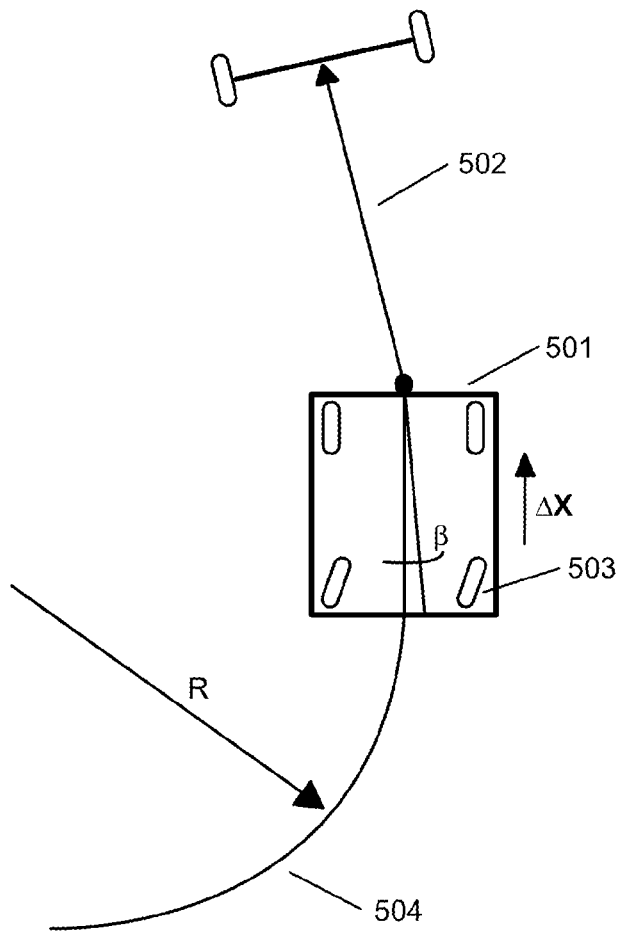
FIG. 5 illustrates the change in the hitch angle between a trailer and a vehicle as that vehicle moves an incremental distance in an arc.

Referring to FIG. 5, a vehicle, 501, pushes a trailer, 502, as it backs up in an arc. To calculate the contribution from the turning of the vehicle, $\beta$, to the change in hitch angle resulting from an incremental backing displacement, $\Delta x$, one must recognize the geometry of the curved path of the vehicle as well. Even if the vehicle and the trailer are momentarily in-line resulting in no angular change in the direction of the trailer, the vehicle is assumed to be following a circular path and the angular change in the direction of the vehicle will effect the angle between the vehicle and the trailer. The radius of this circle, R, is the turning radius and is a function of the steering angle of the front wheels, 503. The circumference of the circular path, 504, on which the vehicle travels equals $2\pi R$ and corresponds to $360°$. The angular contribution of the vehicle by following this curved path is determined by taking the same percentage out of $360°$ that the incremental distance traveled by the vehicle takes out of the entire circumference of the circle on which this curved path exists. In other words, $\Delta x / 2\pi R = \beta / 360°$ or $\beta = 180 \Delta x / \pi R$.

Figure 6:
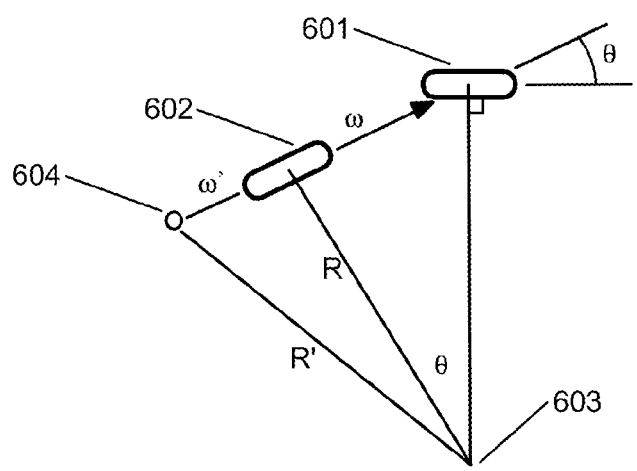
FIG. 6 illustrates the geometries associated with calculating the turning radius of a vehicle from the angular position of the turned front tire.

Computation of the turning radius of a vehicle can be simplified and is shown geometrically in FIG. 6. Front wheel, 601, of the vehicle steers by turning about a point of rotation at or near its center that is approximately in line with rear wheel, 602, and their centers are separated by a distance called the wheel base, w. When steering occurs, front wheel, 601, rotates some amount shown as angle $\phi$. The center point, 603, of the circle of turning is found at the point of intersection of two lines, one each drawn through the center of and perpendicular to the path of travel of each wheel; this dictates that these two lines will meet at an angle equal to the steering angle, $\phi$. Rear wheel turning radius, R, is computed with simple geometry as: $R = \omega / \tan(\phi)$. This approximation will be good enough in many cases. But, it can be made more precise without much effort by incorporating the added distance, $\omega'$, from the center of rear wheel, 602, to the hitch-ball, 604, that is at the point of the hitch rotation (assuming the hitch ball is in-line with the two wheels). This is computed using the Pythagorean theorem resulting in the equation for the turning radius, R', of the hitch-ball, 604, at the point of the hitch rotation: $R' = \sqrt{(\omega/\tan(\phi))^2 + \omega'^2}$. It should be noted that this is an approximation and, as will be addressed below regarding precision, does not have to be perfect (further accuracy would require that the second front and rear wheels be included in the calculation as well as the positioning of the hitch-ball half way between the left and right rear wheels rather than assuming it is in-line with the front and rear wheel). It should also be noted that with front and rear wheel steering, this formula would be modified.

Since the steering wheel is coupled to the wheel steering mechanism, it would be possible to put a sensor on the steering wheel or its shaft and detect the angular position of that steering wheel or shaft and translate that angular position into the angular position of the front wheels. Furthermore, a sensor relating to the steering of the vehicle could include sufficient computational capability (even if only in the form of a lookup table to convert from one measure to another) to sense either the steering wheel or shaft's angular position or the wheel's angular position and return the turning radius thereby saving the main processor the computation time of performing that translation. These variations will be clear to those skilled in the art.

Now, by combining the increase associated with the rotation of the trailer and the decrease associated with the turning of the vehicle into a single equation, the change in hitch angle, $\Delta\theta$, resulting from an incremental distance, $\Delta x$, traveled by the vehicle can be expressed as:

$$\Delta\theta = 2 \sin^{-1}(\Delta x \sin(\theta)/2L) - 180\Delta x/\pi R$$

The new hitch angle, $\theta'$, resulting from an incremental distance, $\Delta x$, traveled by the vehicle is expressed as:

$$\theta' = \theta + 2 \sin^{-1}(\Delta x \sin(\theta)/2L) - 180\Delta x/\pi R.$$

This shall be called the backing equation.

Figure 7:
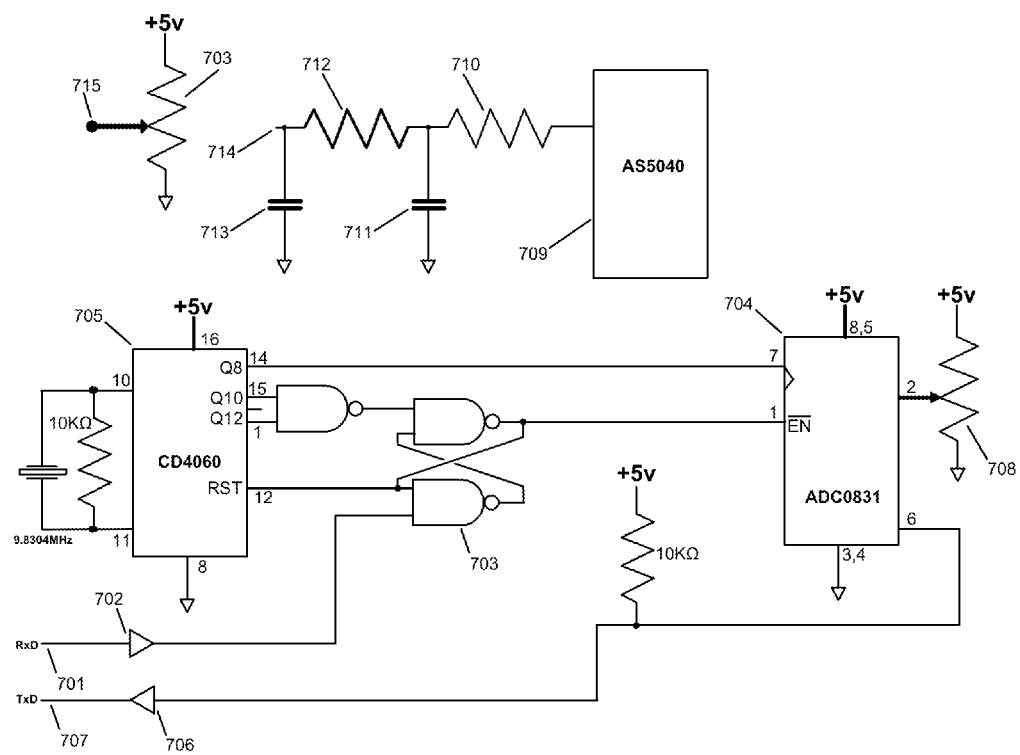
FIG. 7 illustrates a schematic for a remote angular position sensor.

The angle of the front wheels in steering and the angle of the hitch can be measured with simple remote angle sensors. FIG. 7 shows a schematic diagram of an example implementation of such a sensor (in practice, for a heavily used device, which would include most trailers being towed over long distances, the angle sensors should be a magnetic rotation sensor for which there is no wear as opposed to a potentiometer which would experience significant friction while towing and would have an excessively short lifetime; the sensor depicted in FIG. 7 shows both input types and is for illustrative purposes). With this circuit, a data byte is sent into the sensor unit via a serial interface at input RxD, 701, to request a sample of the current angular position be taken and returned. This signal is buffered by line interface receiver, 702, for the voltage levels of the serial link (e.g., an RS-232 receiver) and the start bit of that data byte sets an R-S Flip-Flop, 703, formed by two NAND gates such that a serial Analog-to-Digital Converter, 704, such as the ADC0831 is enabled to run a sample conversion. A crystal oscillator, 705, such as the CD4060 is also enabled and drives the circuit until Analog-to-Digital (A-to-D) Converter, 704, has transmitted its entire sample byte, including start and stop bits, at which point the R-S Flip-Flop, 703, is reset and the process halts until restarted by another incoming data byte. The sample byte transmitted is buffered through line driver, 706, and output from the sensor unit at TxD, 707. The value sampled is the voltage on the input, 716, of the A-to-D, 704. The angle sensing can come from a potentiometer, 708, whereby the output, 715, from the potentiometer, 708, is a voltage proportional to the rotational position of the potentiometer shaft. Alternatively, the angle sensing can come from a magnetic rotary encoder such as the AS5040 from Austria Microsystems AG or an equivalent part. A variety of angular position sensors are commercially available, including magnetic rotational sensors (such as several commercially available devices from Austria Microsystems AG) that will not wear out as quickly as the resistive surfaces within a potentiometer would. The AS5040 magnetic rotary encoder, 709, has a pulse-width modulation output which can be passed through a simple two stage low-pass filter (such as 710 and 711 followed by 712 and 713) as is shown in that company's application notes (other connections to the AS5040 not shown). The output from these two low-pass filters, 714, is a voltage representative of the rotational position of a magnet positioned proximate to the AS5040. Output, 714, would be connected to the input 716 of the A-to-D, 704, instead of the potentiometer, 708. With either the potentiometer implementation or the magnetic rotary encoder implementation, either the shaft of the potentiometer or a shaft to which a magnetic is mounted for operation with a magnetic rotary encoder is provided, and the output is a function of the mechanical linkages between the sensor unit and the two sides of the angle being measured.

Figure 8:
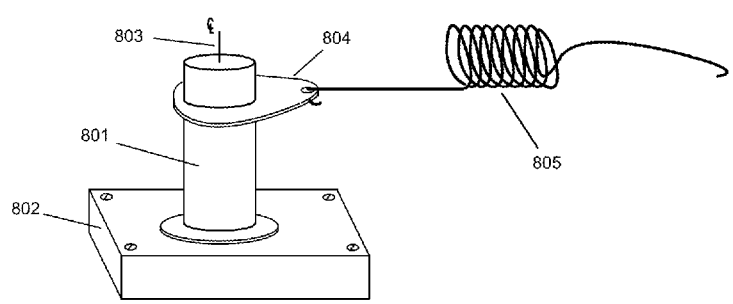
FIG. 8 illustrates a remote angular position sensor with attachment mechanism.

The sensor can be packaged in many ways, with one possible configuration shown in FIG. 8. In this example, the shaft (of either the potentiometer or of the magnet for operation with a magnetic rotary encoder), 801, extends out of a box, 802, housing the electronics. This box, 802, is mounted above the angle to be measured such that the centerline, 803, of the potentiometer, 801, is generally in line with the axis of rotation of the angle to be measured. The box is mounted in a fixed position on one side of the angle to be measured (e.g., to the hitch arm when measuring the hitch angle or to the frame of the vehicle when measuring the steering angle). An attachment is made to the shaft of the potentiometer, 801, with an attachment arm, 804, by means of a spring, 805, or other device to a point on the other side of the angle to be measured (e.g., to the trailer near the hitch when measuring the hitch angle or to a point on the support of the front wheel that moves with that wheel when that wheel is turned when measuring the steering angle).

Figures 9, 10:
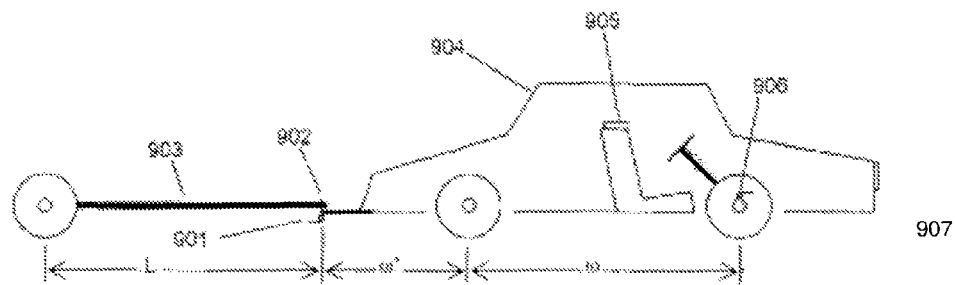
FIG. 9 illustrates possible positions for the sensors and the metering indicator for directing an operator while backing up a trailer.
FIG. 10 lists a table of resulting directions (in degrees) for a given initial hitch angle and steering angle for a single set of parameters.

With the above equations and an understanding of the angle sensors, one can understand an embodiment of the invention as shown in FIG. 9. The hitch angle is measured by way of a sensor, 901, in close proximity to the hitch, 902, pivotably connecting the trailer, 903, to the vehicle, 904. This sensor measures absolute angular position whereby a measurement of zero degrees is calibrated for when the trailer and vehicle are in-line. This angle data is digitized and fed into the microcomputer, 905. The vehicle's turning radius can be determined by measuring the steering angle with an angular position sensor, 906, on the front wheel assembly of the vehicle. The calculations require that certain measurements of the vehicle-trailer system are known and/or have been input into the system including the wheel base, co, the hitch length, w' and the trailer length, L. (An optional servo control 907 to actuate the steering can be included.)

Calibration of the angle sensors includes determining the limits of travel and the center point of travel. Calibration values could be stored in non-volatile memory in the microcomputer. It has been noted that the angular sensors could perform a translation from the measured angle into other forms. The hitch angle could translate a reading from degrees into radians. The turning radius could be determined by measuring the steering angle or the steering wheel angle and translating into the turning radius (this would require that the steering angle sensing module would have, at least, the wheel base of the vehicle and, preferably, the wheel base and the hitch length). Furthermore, the angle sensing module could be preprogrammed with other data; for example, the hitch angle sensor module could be sold as a matched unit with a trailer in which case the hitch angle module could come preprogrammed with the length of that trailer and enable the central microcomputer to query that module for this additional data value rather than require the operator to have to enter the data during a configuration process or when a different trailer is being backed up.

Assuming that the turning radius of the vehicle does not change, the original value sensed for the turning radius is kept constant and, using this newly projected value for the hitch angle, the backing equation is recomputed. This continues in an iterative fashion, using the backing equation with the original turning radius and each newly projected value for the hitch angle, until the projected hitch angle reaches 0°. With each iteration, a variable is incremented to keep track of the number of iterations that have occurred. The iterations stop when the projected hitch angle reaches or crosses zero.

Just as a single increment of distance, $\Delta x$, can be used to determine the angular change in the vehicle's direction with the equation from above, $\beta=180\Delta x/\pi R$, the total angular change in the vehicle's direction can be determined from the number of iterations, k, by multiplying by k in that same equation, or $\Sigma\beta=k180\Delta x/-\pi R$. Since the terminal hitch angle of 0° implies that the trailer and vehicle are in-line, the terminal direction of the vehicle indicates the direction of both the vehicle and the trailer when they are in-line. In other words, $\Sigma\beta$ is the angular change in direction the vehicle will undergo to come in-line with the trailer, given the initial hitch angle and the current turning radius of the vehicle. The above approach can be used to build a table of angular change entries for a range of hitch angles and steering angles for a trailer of known length.

FIG. 10 lists a prior art table of example data for a set of initial hitch angles (across the top of the table) and steering angles (along the left side of the table) for a single set of parameters comprising the wheel base of the vehicle, the trailer length, a standard hitch length, and a backing increment ($\Delta x$). The data points in the table correspond to the change in direction of the vehicle, in degrees, between the current position and point at which the vehicle and trailer become in-line with each other. An entry of "J" indicates a jackknife condition. As an example, if the hitch angle is 5° to the right and the steering angle is 10° the vehicle and trailer will become in-line at the point where the vehicle will have changed its direction by 7° from its starting direction. This table would be unique for a given set of parameters. It will be noticed that the upper left quadrant of the table is nearly identical (except for the sign) to the lower right quadrant (and all values in the other two quadrants represent a jackknife condition) and as a result, only one quadrant (e.g., the lower right quadrant) of this table is needed to be able to store enough of the table to represent the table in its entirety.

In FIG. 16, for an optimized device according to the present invention, all targeted directions for a measure of the turning radius and hitch angle would be pre-computed and stored in such a one quadrant table. This table of data would be pre-computed for a standard sized trailer. In one sense, this is possible because the units of measure (e.g., inches verses centimeters verses feet, for example) are not necessarily defined. As such, the table could be constructed for, say, a trailer having a length of 304.8 inches (25.4 feet) and the system can then be considered to be in inches. But, if a different trailer is used (say, a 10 foot trailer or an equivalent 120 inches or an equivalent 304.8 centimeters), since the units of measure are not defined, the system can now be considered to be in centimeters and the same table will apply. It should be obvious that this system can be used for any arbitrary unit of measure (including a newly invented unit of measure, such as units of "trailer length" or TL) as long as the length of the trailer, when measured in this unit of measure, is 304.8 units long. This means the same table can be used for trailers of any length as long as the units of measure are transformed such that, in this example, the trailer is always 304.8 of these units in length. Of course, the turning radius of the vehicle towing the trailer must be transformed as well to the same units of measure, but the calculation to do the transformation is a very straight forward ratiometric scaling of the units of measure used to construct the table compared to the units of measure that yields the proper length trailer and this calculation is quite manageable for even a low powered microprocessor (i.e., multiplication by a ratiometric scaling factor). The "Trailer Length Conversion Factor" (TLCF) will be the scaling factor that, when multiplied by a value measured in the same units of measure from which the TLCF was created will give a new value in the appropriate "Trailer Length" Unit of Measure (TLUM).

As will be clear to those skilled in the art of mathematics, the above approach when using the so called newly invented unit of "trailer length" or TL is called "normalization" and TL units can be used to "normalize" the table to a trailer having a length of 1 unit (that unit of measure being "Trailer Length") and that the corresponding TLCF is found by taking the reciprocal of the towed trailer's length; both the turning radius and the towed trailer's length can then be normalized by multiplying both by this TLCF with the measured value for the towed trailer's length being a normalized value of 1 TL (just like the trailer used to build the table had a length of 1 TL) and the turning radius of the vehicle towing the trailer becomes a normalized turning radius measured in TL representing turning radius as a multiple of the trailer's length (note that when converting values into units of TL, the length of the trailer used to create the table need not be known in order to determine the angular change in the vehicle's or the trailer's direction according to the present invention, one must only know that the table is in units of TL).

In this way, a low cost microprocessor (one that might not be powerful enough to perform the iterative calculations in real time or that might not even be able to efficiently build the table during an initialization sequence) could be utilized and the projected direction could be looked up from the transformed value of the turning radius and the value of the hitch angle. This approach requires a large enough capacity storage device to hold the table and this will add to the cost of the system.

Additionally, only certain representative or key points from the table need be calculated and the values in between could be interpolated (thereby reducing the capacity of the storage device in or with the microcomputer and the associated additional cost). Furthermore, these data points could be determined empirically by measuring the hitch and steering angle and the resulting in-line trailer direction for a given vehicle and trailer configuration (a rather laborious approach that would work best if a common configuration of vehicle and trailer was anticipated and the calculated approach was, as a result of processor limitations or other reasons, impractical or unavailable). The table could be constructed for combinations of hitch angle and turning radius in which case the vehicle based sensor would have to provide turning radius instead of steering angle (thereby incorporating the wheel base and, optionally, the hitch length) and the table could then be preprogrammed for the specific trailer to be used therewith (this table might be stored in the hitch angle sensor unit). The number of hitch angle entries (e.g., columns) and steering angle or turning radius entries (i.e., the number of data points within the table) is proportional to the accuracy obtainable and, for economic reasons, would be matched to the application (for example, when a human operator is integral to the system feedback loop by guiding/steering the tow vehicle lower accuracy may be possible because of the ability of the operator to correct the path being followed whereas if the steering is being controlled by a servo operated towing vehicle higher accuracy may be desired). This variation might be appealing to trailer manufacturers who might desire to build a trailer with the present invention included without regard to the vehicle with which it may be used.

In the event that an in-line position between the tow vehicle and trailer cannot be reached given the initial hitch angle and the current turning radius of the vehicle, an alarm could be signaled (e.g., visually) to notify the operator that the trailer has or is on track to jackknife to one side or the other. This visual notification should indicate to which side the trailer has begun to jackknife because it might not be immediately apparent when the vehicle and trailer are nearly in-line.

To run the iterative calculation, a computer reads the current hitch angle and the vehicle's steering angle and each time the set of readings is made, the computer runs a set of calculations. The calculations are run iteratively for a given pair of readings (see FIG. 11 for an example of code to iteratively compute the projected in-line direction of the vehicle and trailer from these two readings, relative to the vehicle's starting position—note that in this C source code, the backing equation is calculated entirely in radians to eliminate the need to convert from degrees to radians and back again on every iteration of the calculation). A constant incremental value for $\Delta x$ is used; the smaller the value of $\Delta x$ the more accurate the result, but the longer the iterative computation will take to complete. A tradeoff between accuracy and processing time (which is also a function of the processing speed of the computer) may have to be made. In running the solution, the program iteratively computes the backing equation for the set of readings to project what the new hitch angle will be following each additional increment of travel, $\Delta x$. This iterative calculation continues until the new hitch angle reached or crosses through zero which corresponds to the vehicle and trailer being in-line (when the angle equals zero). The number of iterations that are required until the new hitch angle crosses through zero is the number of increments of $\Delta x$ that the vehicle will have to back up, given the initial values of the hitch angle and steering angle, in order for the trailer and vehicle to become lined up. The steering angle is presumed to not change during the calculation and so too the turning radius is presumed not to change. As a result, since the number of increments has been calculated as a part of the iterative solution, the distance traveled along the arc of the turning radius can be computed and so too the change in angular direction of the vehicle. (The distance to be backed up could, optionally with additional display electronics, be displayed to the operator.) If the vehicle were to travel this distance (if it were to actually back up the distance computed in the iterative calculation while keeping the steering angle, and therefore the turning radius, constant), the vehicle and the trailer would be in-line with each other. As a result, by displaying the projected change in angular direction on a meter such that the number of degrees of change in angular direction calculated is the number of degrees of deflection shown on the needle of the meter, that meter can be positioned flat on the shoulder of the driver's seat such that the needle will point in that direction of the path behind the vehicle where the vehicle and trailer will be headed when the vehicle and trailer are in-line. Note that the meter would be positioned and calibrated such that a value of zero, that is to say that the calculation indicates that no change in direction will result in the vehicle and trailer being lined up (i.e., the trailer and vehicle were already lined up at the start of the calculation when the hitch angle and the vehicle's steering angle were sampled), would have the needle of the meter pointing directly back behind the vehicle. The iterative backing calculation requires that some constant values will also have to be stored in the computer; these include, in addition to the hitch angle and the turning radius, the number of degrees that the meter can display or that can be displayed by a one-half scale deflection of the meter and the trailer length. In order to compute the turning radius (see FIG. 12 for an example of code to compute an estimate of the turning radius having sufficient accuracy to implement the prototype), in addition to the steering angle sample, some constant values will also have to be stored in the computer; these include the wheel base and the hitch length (the square of the hitch length can be precomputed to save processing time). In operation, when the hitch angle is large and the steering angle is small, many more iterations are required to converge on a solution. As a result, performance can be sluggish under this condition and backing speed should be slowed to be most accurate. With the present invention, the iterative solution is replaced by a ratiometric conversion of the inputs along with a more efficient algorithm.

Note that the precision of the operator guided system need only be as accurate as the operator can perceive given the resolution of the user interface. If a mechanical metering output device is utilized, one's eye might not be able to distinguish the difference between one projected direction and another projected direction if those two directions only differ by a few degrees or a fraction of a degree. As such, the accuracy of the calculations need not be more precise than the operator could perceive on that output device such that bringing the vehicle and trailer in-line need only be generally in-line enough to guide the operator. This ability to limit the precision should help to keep the cost of the system down as the calculations can be simplified, iterated to a lesser degree of precision, or otherwise approximated. This also applies to the precision used for the sensing of the angular inputs and their translation into other forms, as would be the case when sensing the steering angle and translating that steering angle into the turning radius or in deciding whether or not to include the hitch length. However, when the steering of the tow vehicle is servo controlled, greater precision may be desirable.

Variations on the computation may involve calculating the various order derivatives of the hitch angle. For example, knowing the hitch angle and backing up some distance $\Delta x$ and then rereading the hitch angle will yield the first derivative (change in hitch angle per change in position, $\Delta x$); backing up an additional distance $\Delta x$ will not only yield a second measure of the first derivative but will also yield a measure of the second derivative. With these various order derivatives one could employ a Taylor Series expansion-like approach. One could also use Runge-Kutta, Adams-Moulton or other forms of Numerical Calculus or Dynamic Simulation or the like. An analog circuit could be constructed using such analog circuits as op-amps, integrators, adders, and the like.

The angular change in direction, $\Sigma\beta$, is shown graphically to the operator. As stated above, one way this can be done is by converting $\Sigma\beta$ to an analog voltage; this voltage is displayed on a traditional analog needle meter. The zero point would be set to the center of the meter's deflection range. The meter would be positioned in the vehicle in view of the operator when he is turned to look out the back of the vehicle (just as he would be looking when backing up with a trailer without the present invention) such that the needle would point straight out the back of the vehicle when $\Sigma\beta$ reads zero. For the particular meter used, the angles of the needle should be measured on the face of the meter for its maximum and minimum deflections from this center position. These angles will correspond to the largest angle to the left and right that can be displayed. Scaling the output voltage for $\Sigma\beta$ to fit the meter's scale should be clear to those versed in the art. When the needle is deflected to either its maximum or minimum position, the operator must assume that a potential jackknife condition may exist. Many types of display mechanisms could be used instead of the meter—LCD displays or other electronic graphical displays showing a pointer or otherwise indicating a direction, LED's along the top edge of the rear window, projected beams of light from a laser diode movably mounted, and a wind-vane like pointer movably mounted on top of a rod extending up from the top of the hitch are a few alternate display possibilities.

But, a preferred solution is to replace the meter type pointing device with a video system or use the video in addition to a pointing device. Such a solution comprises a video camera or image sensor on the back of the vehicle (such as when a boat trailer is empty) or on the back of the trailer (such as when the trailer is carrying a boat) along with a video monitor visible to the operator. This might be especially useful for tall trailers that may block the view from the vehicle. The camera could be movably mounted such that the left to right direction of the camera is motor controlled (i.e., motorized panning) instead of or in addition to the pointer. In this way, the image on a monitor screen in the vehicle would show where the trailer is going to go by turning the camera such that the target is kept in the center of the screen. The angle would be adjusted because if the camera is on the trailer and the trailer is already turned by the angle of the hitch, one would not want to incorporate the hitch angle component of the projected direction twice (the projected angle reflects the amount of turning of the vehicle to come in-line with the trailer, but the trailer is already partly turned in the direction of that projected direction). In addition, an on screen indicator could notify the driver when a jackknife condition is reached or imminent and to which side (instead of having the camera swing off to that side). Alternatively, the camera could remain fixed while an on screen indicator (e.g., a superimposed line, arrow, icon, or other graphic) would identify the target direction of the trailer on the video monitor. This solution has the added benefit of a safety camera monitoring system for safer backing. Some drivers may prefer a left-to-right mirror imaging of the camera image to facilitate more comfortable steering.

When the video system variation is used in conjunction with a towing vehicle having servo controlled steering, the operator would turn a knob which would cause the video camera to pan in proportion to the knob turning; this would enable the operator to turn the knob until the desired destination for the trailer is visible in the center of the video screen. The angle of panning of the camera would then also be the angle of the projected direction (being careful to distinguish the difference between the vehicle mounted camera and the trailer mounted camera which is adjusted to not double-count the hitch angle). Without a video system, a pointer mounted on a knob could be used to thereby enable the operator to turn the knob until the pointer is pointing in the desired direction, and this angle of the pointer would be the angle of the projected direction. With either operator input mechanism (or any other), the system would then perform a reverse lookup from the table (i.e., to search the line in the table corresponding to the current hitch angle in order to find the angle of the projected direction or the two adjacent angles of the projected direction to facilitate an interpolated solution) in order to identify the turning radius from the table (or interpolated therefrom). This turning radius (with any adjustment for its being in Trailer Units) is transferred to the servo steering control to cause the towing vehicle to adjust its steering angle (i.e., to turn the steering wheel).

The knob in both the video system variation and in the simple knob mounted pointer variation could be thought of as a miniature steering wheel. The operator would continuously maintain the indication of the direction as the vehicle and trailer are moving. In other words, as the vehicle backs up and the trailer and/or vehicle turns, the knob will have to be turned in the opposite direction (to offset such turning of the trailer and/or vehicle) such that the direction of the intended path is kept the same. The knob can be sensed by a rotation sensor and this sensor could have a zero position or it could have no zero position; in this latter case, the rotation of the knob would be relative to the current intended direction being shown on the display.

A second design utilizing a low cost microcomputer chip uses the single precomputed table approach with unit of measure transformation. This design incorporates display means to indicate the range of projected directions for the vehicle to become in-line with the trailer. This display means can comprise either a meter pointing device, an LCD display panel, and/or a rearview video screen with superimposed curves indicating the limits to the range of projected directions with either the current projected direction centered on the screen or indicated with an additional superimposed curve.

Figure 13:
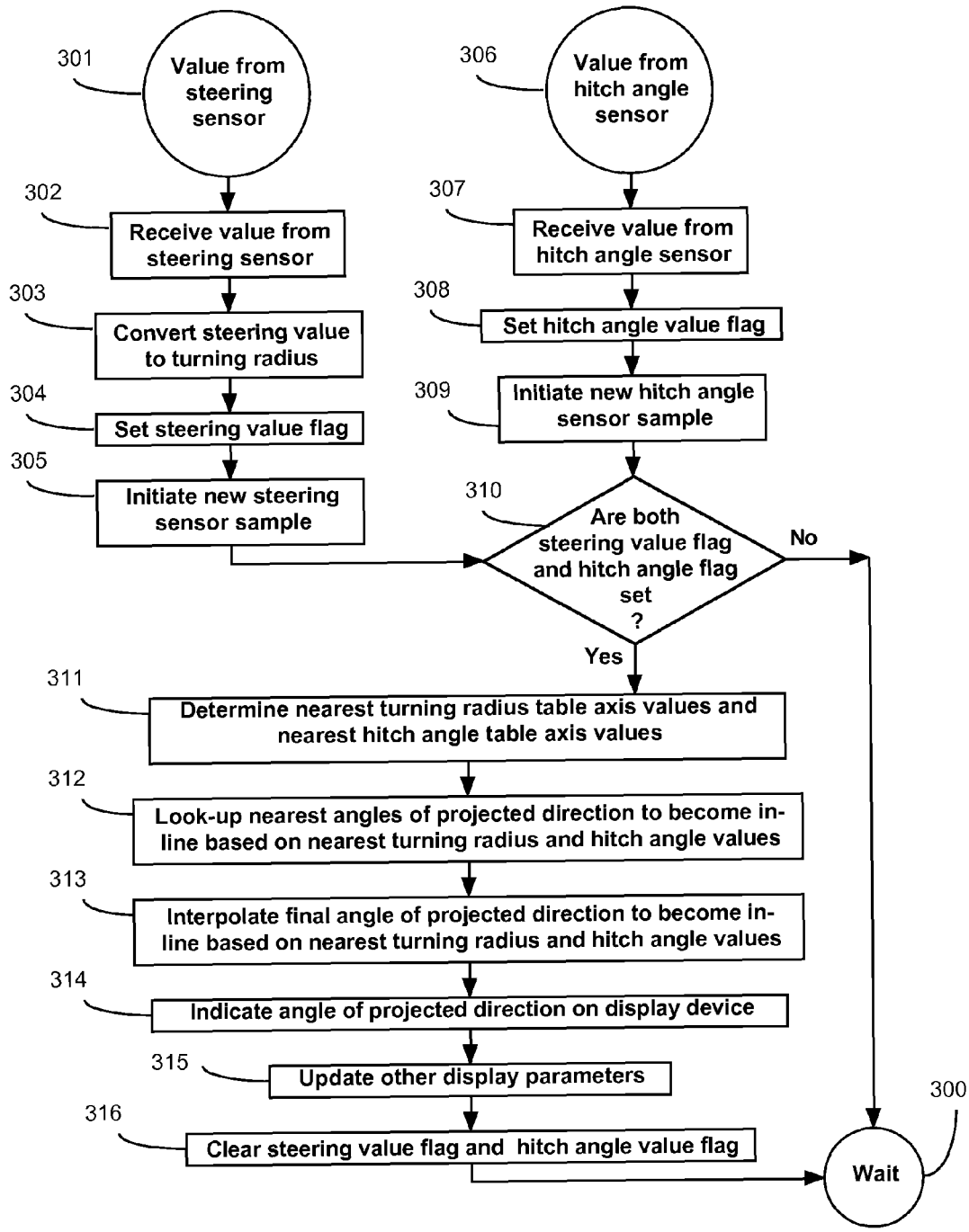
FIG. 13 is a flow chart for collecting the hitch and steering angle and displaying the projected path.

A flow chart for this prototype is shown in FIG. 13. In this flow chart, the process operates as an interrupt routine where interrupts are triggered by reception of the input angle values and the resulting projected to become in-line value is determined and output on the display device. The software routine is entered when a value is received from the steering sensor 301 or from the hitch angle sensor 306. This routine entry could be caused by an interrupt on a serial port. When an interrupt occurs for the steering sensor serial port 301, the steering sensor value is read in from the steering serial port 302 and converted into the corresponding value for a turning radius 303. This conversion is accomplished by looking up the turning radius in a list that provides a turning radius value for a given steering sensor value. This conversion will also apply the scaling factor, TLCF, to the turning radius value to convert from the units of measure of the turning radius list into the units of measure for the projected direction look-up table (wherein the units of measure in the table are in the "trailer length" unit of measure—TLUM). This may optionally include interpolating for the final turning radius value from the two closest (one higher and one lower) list entries for steering. This final TLUM turning radius value is stored in a variable and a steering value flag is set to indicate that the turning radius value is ready. A check is made to see if both the turning radius value and the hitch angle value are available 310 and, if both are not available, the process returns to waiting mode 300. When an interrupt occurs for the hitch angle sensor serial port 306, the hitch angle sensor value is read in from the hitch angle serial port 307 and this value is stored in a variable and a hitch angle flag is set to indicate that the hitch angle value is ready. A check is made to see if both the turning radius value and the hitch angle value are available 310 and, if both are not available, the process returns to waiting mode 300. This waiting mode 300 would be a main loop wherein other functions would be monitored and performed (such as display refreshing and processing events from a user interface). Alternatively, the serial ports for steering and for the hitch could be monitored in a main loop (along with other functions) and this routine could be entered by branching from that main loop when data is received in either serial port; in this case, the steps to be performed when a steering value is received 301-305 and the steps to be performed when a hitch angle value is received 306-309 (along with the conditional test to branch 310) could be incorporated in that main loop. Note that the angle sensors can be made free-running in which case no step to initiate a new sample 305 & 309 would be required; if not free-running, the angle sensors would have to be started up in an initialization routine.

Once both the turning radius value (TRV) and the hitch angle value (HAV) are ready, the projected direction when both the vehicle and trailer are in-line is looked-up. Interpolating a value not specifically included in the table is performed by first looking-up the closest values on one axis of the table for the hitch angle, i.e., the closest value below ($HAV_L$) and above ($HAV_H$) the hitch angle value (HAV) and for the final turning radius, i.e., the closest value below ($TRV_L$) and above ($TRV_H$) the final turning radius value (TRV) in 311. This will enable the look-up of four Table Entries for hitch angle low & turning radius low ($TE_{LL}$), hitch angle low & turning radius high ($TE_{LH}$), hitch angle high & turning radius low ($TE_{HL}$), and hitch angle high & turning radius high ($TE_{HH}$) in 312. Next, in 313, a final value is determined by first interpolating two values—one value, $TE_L$ is interpolated from the two looked-up values corresponding to hitch angle low & turning radius low ($TE_{LL}$) and hitch angle low & turning radius high ($TE_{LH}$) and the other value $TE_H$ is interpolated from the two looked-up values corresponding to hitch angle high & turning radius low ($TE_{HL}$) and hitch angle high & turning radius high ($TE_{HH}$) by finding the value proportionally between them. These are calculated from the proportional distance between the two turning radius values and this proportionality factor is $TRV\Delta=(TRV-TRV_L)/(TRV_H-TRV_L)$ such that $TE_L=(TRV\Delta*|(TE_{LL})-(TE_{LH})|+TE_{LL})$ and $TE_L=(TRV\Delta*|(TE_{HL})-(TE_{HH})|+TE_{HL})$. The final interpolated value is calculated from the proportional distance between the two hitch angles and this proportionality factor is $HAV\Delta=(HAV-HAV_L)/(HAV_H-HAV_L)$ such that $TE=(HAV\Delta*|(TE_L)-(TE_H)|+TE_L)$. This angle, TE, is then displayed on the display device, such as a meter pointing device, as outlined above. Any other display updates would be performed in 315, including the display of the upper and lower limits to where the projected paths can go for the hitch angle HAV. Interpolation for these upper and lower limits is optional in that, given HAV, the greater low value and the lesser high value will generally suffice. These can be found by locating the line in the table corresponding to $HAV_L$ and scanning down that table line for the first and last values (where one value will be the extreme corresponding to the tightest turning radius available and the other will be the extreme corresponding to the point just before jackknifing). For example, looking at table in FIG. 10, if the hitch angle value, HAV, is 13 degrees and the tightest turning radius for the vehicle corresponds to the steering angle of "50" then the lower limit can be estimated to be 18 (i.e, the greater of 11 and 18) and the upper limit can be estimated to be 30 (i.e, the lesser of 30 and 42). Finally, in 316, the steering value flag and hitch angle value flag are cleared and program control returns to the wait routine 300 (this includes any interrupt service routine return functions if interrupt driven control is utilized). To prevent against a lost data byte due to a communications glitch, a watch-dog timer routine can be utilized to clear the serial ports and data values and to reinitiate sampling requests to both sensors.

The path of the trailer can be overlaid on the video screen. The tow vehicle's path for each of these projected paths is easily projected based on the vehicle's turning radius alone and could be used as a good approximation of the path from the starting position to the final position (at which point the tow vehicle and trailer will be approximately in-line). The two extreme paths (i.e., the ISL and the TTL) can likewise be displayed.

An alternative to the table described above and depicted in FIG. 16 would be to keep hitch angle on one axis, but to reverse the positions of the turning radius and change in tow vehicle direction. Ignoring for the moment the issue of interpolating to find an exact value, this is to say that the second axis would comprise the angular predicted direction for where the vehicle and trailer become generally in-line and the body of the table would contain turning radius values (normalized for trailer units or the like). In such a variation, the computing device would still scan or otherwise search a line to locate turning radius, but this line, rather than be found as the second axis, would be the line in the table corresponding to the current hitch angle. Once the turning radius is located on the current hitch angle line, the corresponding angular value on the other axis would be the sought angular change in direction.

While the table described above is said to be in units of trailer length, such a unit is arbitrary and is used as a possible unit out of many. The units could have just as easily been ⅒ of a trailer, two feet, or whatever. The essence of the present invention is that a table can be used for rapid lookup of answers with interpolation being used for values not in the table and ratiometric scaling used for trailers having a length measured in units that are different from the units used to build the table. It is contemplated by the present invention that other approaches to obtaining the projected direction can be utilized; for example, a calculated solution could be implemented whereby this calculation is optimized for a tow vehicle and trailer of a known length (in Trailer Units) in order to make the calculation most efficient in software while incorporating ratiometric scaling for trailers having a length measured in units that are different from the units used to process the calculation.

FIG. 14A-D depicts four scenarios of tow vehicle steering with the hitch angle to the left. Left-right mirror images apply for hitch angles to the right. A hitch angle to the left is arbitrarily defined as a positive valued hitch angle whereas a hitch angle to the right is a negative value. A steering angle to the left is defined as a positive valued steering angle whereas a steering angle to the right is a negative value. Because of this minor symmetry, the sign of the hitch angle can be ignored for the purpose of determining the projected angle where the tow vehicle and the trailer become generally in-line and then the sign restored before using that projected result. (This is consistent with only storing a single quadrant from the table as described above for FIG. 10.)

Figure 14D:
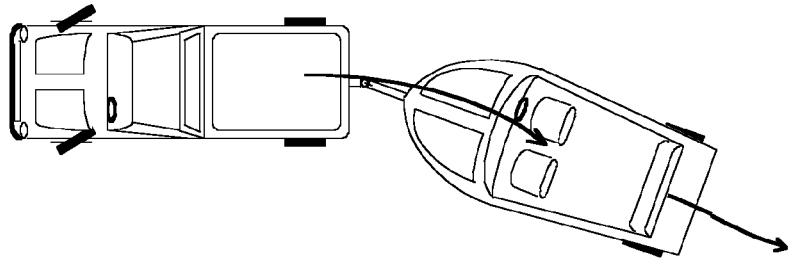
FIG. 14A-D is a range of depictions showing the relationship of the projected path limits.
Figure 14C:
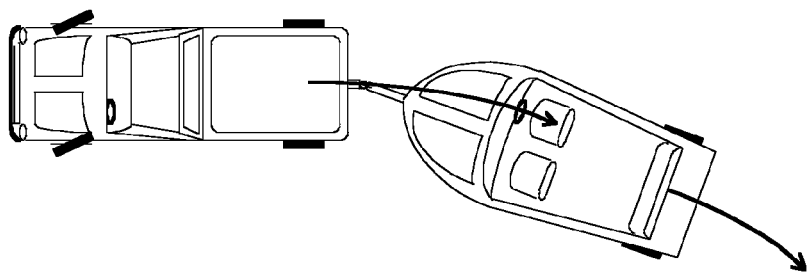
Figure 14B:
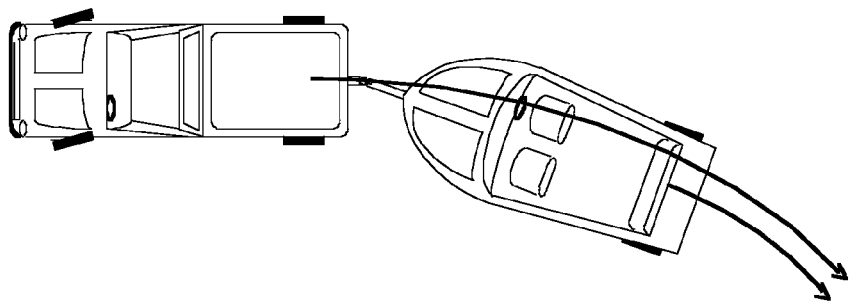
Figure 14A:
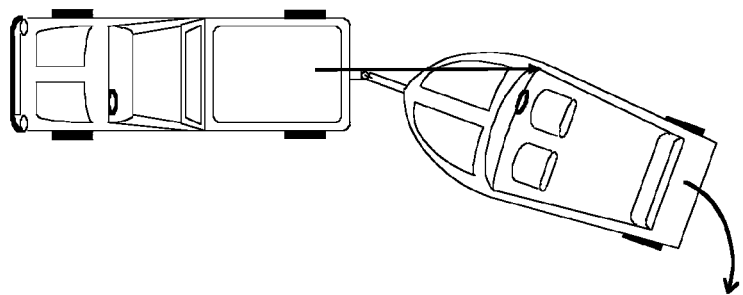

FIG. 14A shows the tow vehicle steered to drive straight backwards (note the position of the front wheels of the tow vehicle). In this scenario with the hitch angle to the left, as the tow vehicle reverses the trailer will jackknife to the left. FIG. 14B depicts the first limit condition, that of infinite turning. In this scenario, a backing increment will be translated into motion by the trailer whereby a portion of that backing increment will go into backing the trailer and a portion into rotating the trailer, as described above. When the incremental amount of trailer rotation matches the amount of tow vehicle turning as a function of the steering angle, the hitch angle will be unchanged after completing the backing increment from what it was before the backing increment. As a result, the next backing increment (assuming no change to the steering angle) will result in the same hitch angle again and, in theory (because in real life, imperfections in the apparatus, driving surface, and the like will prevent the perfect outcome) the tow vehicle and trailer could drive indefinitely along the arc of a circle defined by this steering angle (and matched by this hitch angle). This steering angle (or, of course, it's corresponding turning radius) defines the first limit condition and this is a function of the trailer length. Any steering angle that moves away from this infinite turning steering angle towards the straight line steering condition (or beyond) will result in jackknifing to the left where the farther from the infinite turning angle the more rapidly jackknifing will occur. Any steering angle that moves away from this infinite turning steering angle in the opposite direction (i.e., away from the straight line steering condition) will result in a controlled steering of the trailer and this is depicted in FIG. 14C. However, as depicted in FIG. 14D, there is a second limit which is a function of the vehicle and is obtained when the steering angle reaches the greatest or sharpest angle (i.e., tightest turning radius) that the tow vehicle can turn. One most commonly thinks of controlled backing with a trailer as occurring between the Infinite Steering Limit (ISL) and the Tightest Turning Limit (TTL). There is an ISL and a TTL to both the left side and the right side of the vehicle center line. However, it is the steering outside of these limits that requires special understanding if maneuvers such as Parallel Parking with a trailer and Reversing Directions with a trailer are to be affected. Therefore, to increase the hitch angle, the tow vehicle must temporarily steer in the range where jackknifing would occur and to decrease the hitch angle, the tow vehicle must steer in the range between the ISL and the TTL, inclusively. To reverse the hitch angle, the tow vehicle must steer in the range between the ISL and the TTL, and continue backing beyond the point where the tow vehicle and the trailer become generally in-line. One or more of these limit lines can be displayed by superimposing an arc corresponding to these turning angles, as is known in the prior art.

Figure 15A:
FIG. 15A-E is a range of depictions showing how the projected path would be to parallel park a tow vehicle with an attached trailer according to the present invention.
Figure 15B:
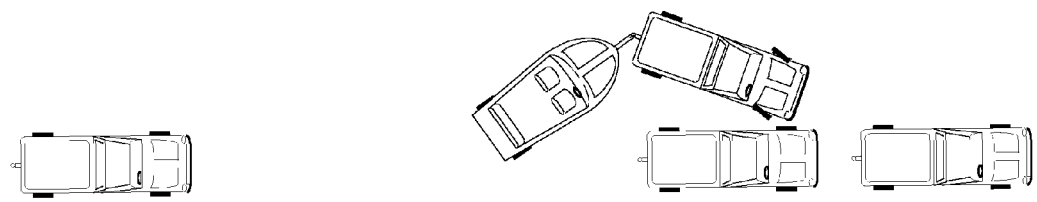
Figure 15C:
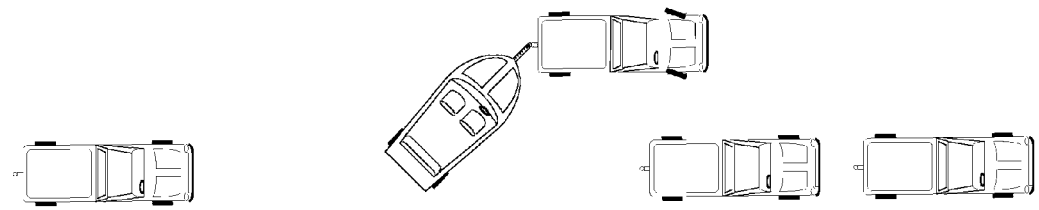
Figure 15D:
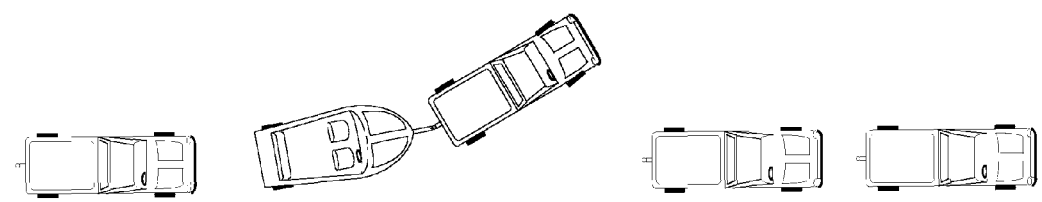
Figure 15E:
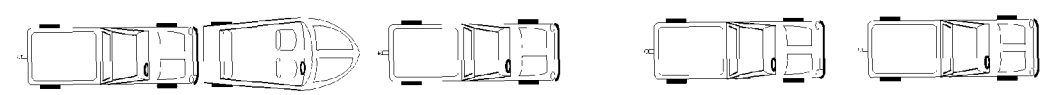

As an example of operation when parallel parking with a trailer into a parking space (with the curb on the right), the vehicle and trailer initially pull forward of the space (at which point they are in-line). The vehicle is first steered to the left (see FIG. 15A) by an amount that will not cause the front right corner of the vehicle to strike a parked car while backing up. This first steering is estimated by the operator if the present invention is being used as a direction indicator, or if servo controlled steering is being used with automated back-up control (as is known in the art), this first steering can be determined based on the right side collision sensors. As is now shown in FIG. 15B, this will cause the trailer to turn to the right, directing its back end into the space. Backing continues until the back of the space falls between the left side ISL and TTL. The vehicle is now secondly steered to the right with an amount of steering close to the TTL, and as shown in FIG. 15C, this will cause the trailer to move only a little bit farther into the space (to allow room for the straightening step) and to cause the vehicle to start to become in-line with the trailer. The vehicle continues to back up to the point where the vehicle and trailer become in-line. Then, as shown in FIG. 15D, the vehicle continues to back up beyond that the point where the vehicle and trailer became in-line, causing the trailer to cross the center line of the vehicle. At this point, the trailer will be generally in the space and the vehicle is thirdly steered to the left with the aid of the present invention by an indicated amount that will direct the trailer to the back of the space. With this third steering, as shown in FIG. 15E, the vehicle continues to back up until the trailer and vehicle become generally in-line within the parking space. In the prior art, Fischer et al. in their U.S. Pat. No. 7,089,101 (at column 9 line 43 through column 10 line 39), while no method for determining the path of a tow vehicle backing with a trailer is disclosed, a method is disclosed to retard the speed of the tow vehicle if the actual path deviates from a projected path (however it is determined), and this method could be utilized along with the present invention. However, the present invention is likewise envisioned to be utilized in situations where the steering is controlled by servos but the accelerator and break are controlled conventionally by the operator.

Obstacle sensors are recommended for partially automatic guided (and required for fully automatic guided) trailer backing systems. However, such sensors will need to be trailer mounted as vehicle mounted sensors could be blocked by the trailer and sensor selection will be limited to those sensors that will not be affected by being submerged along with a boat trailer, often into water containing dirt or plant or other debris that could obscure or otherwise diminish or defeat the sensors' operation. An operator guided system, even if the steering is servo controlled, would have minimal risk of the operator erroneously relying on sensors that are not obscured. While the embodiment depicted in FIG. 7 utilizes sensors that transmit a data byte corresponding to a measured angle whenever any byte is received, a more complex sensor could be constructed, as would be apparent to one skilled in the art, such that the angle measurement byte is only transmitted when a specific byte is received (either by a hardwired connection or by a wireless connection such as Bluetooth). In this way, some other byte or bytes received could implement a command structure that could cause the transmission from the sensor of other preprogrammed or real-time data, either as a single data value or as a packet of multiple data values, corresponding to the wheel base of the vehicle, the trailer length, the steering ratio, the current position of the steering wheel, the current position of the front tires, if the break lights are energized, or other information. In this way, a steering sensor could be incorporated or otherwise installed in the vehicle and the system could query that sensor for particular preprogrammed data regarding that vehicle (e.g., wheel base, hitch length, the byte value for zero degrees of turning, the byte value for a specific known angle to eliminate the need to calibrate the scale factor, or the like) or a hitch angle sensor could be incorporated in the trailer and the system could query that sensor for other preprogrammed data regarding that trailer (e.g., the trailer length, the byte value for the zero degree angle, the byte value for a specific known angle to eliminate the need to calibrate the scale factor, or the like).

The foregoing description of an example of the preferred embodiment of the invention and the variations thereon have been presented for the purposes of illustration and description. It is not intended to be exhaustive or to limit the invention to the precise forms disclosed. Many modifications and variations are possible in light of the above teaching. It is intended that the scope of the invention be limited not by this detailed description, but rather by any claims appended hereto.

We claim:

1. A method of controlling the direction of a towed trailer that has a length that can be measured, that is connected to a tow vehicle by a jointed connection, and that is being pushed with the jointed connection by the tow vehicle, and where the tow vehicle has a front set of wheels and a rear set of wheels with the two sets of wheels being separated by a distance and an angle of at least one of the two sets of wheels is changeable to effect steering, comprising the steps of:
   I.) determining a jointed connection angle, the jointed connection angle being formed at the intersection of a centerline of the tow vehicle and a centerline of the trailer,
   II) determining a value representative of the steering of the tow vehicle, this steering value being related to the angle of the set of wheels that is changeable to effect steering,
   III.) using an electronic computing device for determining a turning value whereby inputs to the turning value determination comprise (i) the determined steering value for the tow vehicle, (ii) the separation distance of the two sets of wheels of the tow vehicle, and (iii) the length of the towed trailer, and
   IV.) using an electronic computing device for determining a potential change in direction of either the tow vehicle or the towed trailer by using the turning value to look up an angular value indicating where the trailer and the tow vehicle will become generally in-line from a fixed table, by looking up within the table where the turning value would be and locating a corresponding potential change in direction value on an axis.

2. The method of claim 1 further comprising the step of utilizing a direction indicating device either as an output to indicate the determined change in direction of either the tow vehicle or the trailer or as an input to indicate a desired direction for either the tow vehicle or the trailer.

3. The method of claim 2 further comprising controlling the direction of the trailer by controlling the direction of the tow vehicle based upon the direction indicating device.

4. The method of claim 3 whereby the angle of the at least one of the two sets of wheels that is changeable to effect steering is changed by one of (i) a human operator, (ii) an automatic driving device, or (iii) a semi-automatic driving device involving a human operator.

5. The method of claim 2 whereby the direction indicating device comprises one of more of a meter, a needle, a knob, a pointer, a miniature steering wheel, a projected beam of light, an electronic graphical display, a row of LED's, or overlay lines on a video display.

6. The method of claim 1 comprising a display device to indicate to a human operator the potential change in direction where the trailer and the tow vehicle will become generally in-line.

7. The method of claim 5 whereby the display device comprises a graphical display.

8. The method of claim 5 whereby the display device comprises a video image capture device and video image display device.

9. The method of claim 8 whereby the video image capture device is movable and is controlled to point in the potential change in direction where the trailer and the tow vehicle will become generally in-line.

10. The method of claim 8 whereby the image displayed on the video image display device further comprises an indication of the potential change in direction where the trailer and the tow vehicle will become generally in-line.

11. The method of claim 10 whereby the image displayed on the video image display device further comprises an indication of the upper and/or lower limit to the projected direction of the trailer for a given jointed connection angle.

12. A device for predicting the direction of travel of a towed trailer that has a length that can be measured, that is connected to a tow vehicle by a jointed connection, and that is being pushed with the jointed connection by the tow vehicle, and where the tow vehicle has a front set of wheels and a rear set of wheels with the two sets of wheels being separated by a distance and an angle of at least one of the two sets of wheels is changeable to effect steering, comprising:
   I.) a sensor to determine a jointed connection angle, the jointed connection angle being formed at the intersection of a centerline of the tow vehicle and a centerline of the trailer,
   II.) an electronic device to determine a value representative of the steering of the tow vehicle, this steering value being related to the angle of the set of wheels that is changeable to effect steering,
   III.) an electronic computing device to determine a turning value whereby inputs to the turning value determination comprise (i) the determined steering value for the tow vehicle, (ii) the separation distance of the two sets of wheels of the tow vehicle, and (iii) the length of the towed trailer, and
   IV.) an electronic computing device to determine a potential change in direction of either the tow vehicle or the towed trailer by using the turning value to look up an angular value indicating where the trailer and the tow vehicle will become generally in-line from a fixed table, by looking up within the table where the turning value would be and locating a corresponding value on an axis.

13. The device of claim 12 where using the turning value to look up a value in a fixed table comprises interpolating a value from two or more values in the table or on an axis.

14. The table of claim 12 whereby the fixed table comprises two dimensions, whereby values in the direction of a first dimension are a function of the jointed connection angle and values in the direction of a second dimension are a function of possible turning radii of the tow vehicle adjusted for the length of the towed trailer, whereby either the entries in the table or the values on the axis for the second dimension represent predicted directions where the trailer and the tow vehicle become generally in-line as a function of the jointed connection angle, the turning value and the towed trailer's length.

15. The device of claim 12 further comprising one or more of (i) a visual indicator or (ii) an audio indicator to indicate a jackknife condition.

16. A system comprising a towed trailer (A) that has a length that can be measured, (B) that is connected to a tow vehicle by a jointed connection, and (C) that is being pushed with the jointed connection by the tow vehicle, and where the tow vehicle comprises (a) a front set of wheels, (b) a rear set of wheels, whereby the two sets of wheels are separated by a distance and an angle of at least one of the two sets of wheels is changeable to effect steering, and (c) an electromechanical actuator to effect the amount of steering of the tow vehicle, further comprising:
   I.) a sensor to determine a jointed connection angle, the jointed connection angle being formed at the intersection of a centerline of the tow vehicle and a centerline of the trailer,
   II.) a direction indicating input device for indicating a desired angular change in direction in which an operator would have either the tow vehicle or the trailer travel,
   III.) an electronic computing device to determine from a fixed table a turning value for the tow vehicle comprising the steps of (i) locating an angular value corresponding to the determined jointed connection angle, and (ii) locating a turning value for the tow vehicle adjusted by the towed trailer's length corresponding to the desired angular change in direction of either the tow vehicle or the towed trailer on a line in the table corresponding to the determined jointed connection angle, whereby the line in the table comprises a range of values representative of the turning of the tow vehicle adjusted by the trailer's length,
   IV.) an electronic computing device to determine a steering value for the tow vehicle by making an adjustment to the located turning value, the adjustment comprising the separation distance of the two sets of wheels of the tow vehicle and the trailer's length, and
   V.) applying the determined steering value to the electromechanical actuator to effect an amount of steering of the tow vehicle.

17. The system of claim 16 further comprising one or more of (i) an upper limit, and (ii) a lower limit to the effected amount of steering of the tow vehicle.

18. The system of claim 17 whereby if the desired amount of steering is (i) to a first side and (ii) outside of a range defined by either the upper limit or the lower limit, steering will be effected to a second side until the desired amount of steering is brought within the range defined by the upper limit or the lower limit.

19. The device of claim 16 further comprising an obstacle sensor.

20. The device of claim 19 whereby the obstacle sensor in mounted on the trailer.

* * * * *